United States Patent [19]
Smith

[11] 3,949,446
[45] Apr. 13, 1976

[54] STUFFING HORN

[75] Inventor: David W. Smith, West Des Moines, Iowa

[73] Assignee: Townsend Engineering Company, Des Moines, Iowa

[22] Filed: Apr. 19, 1974

[21] Appl. No.: 462,244

[52] U.S. Cl. .................................................. 17/41
[51] Int. Cl.² ................................................ A42C 11/02
[58] Field of Search ............... 17/35, 41, 42; 26/3 F; 43/43.13, 43.1, 42.72; 285/390, 333, 334, 27

[56] References Cited
UNITED STATES PATENTS

| | | | |
|---|---|---|---|
| 1,384,601 | 7/1921 | Costello, Jr. | 17/35 |
| 3,442,536 | 5/1969 | Fowler | 285/27 |
| 3,465,908 | 9/1969 | Acton | 215/333 |
| 3,631,650 | 9/1969 | Leftault, Jr. | 215/343 |
| 3,835,503 | 9/1974 | Townsend | 17/35 |

*Primary Examiner*—Robert Peshock
*Attorney, Agent, or Firm*—Zarley, McKee, Thomte, & Voorhees

[57] ABSTRACT

An improved stuffing horn for a meat encasing apparatus which includes as an integral part thereof a rotating stuffing tube. The stuffing tube has a horn mounted on its forward end in order to assist in the casing filling process. The stuffing horn, or fin head, of this invention is preferably multiple threadably engaged with the stuffing tube and is designed to provide a smooth bore through the stuffing tube and into the fin head. The fin head is securely fastened to the stuffing tube but yet easily removable and since a smooth bore exists meat emulsion flow through the tube is generally laminar without impeding turbulence and drag.

2 Claims, 3 Drawing Figures

STUFFING HORN

BACKGROUND OF THE INVENTION

This invention relates to an improvement in a machine for encasing a product to provide sausages or franks and the like and more particularly to an improvement in such a machine designed to provide capability of encasing a product with casings made of delicate material such as natural animal intestines or delicate artificial materials.

In preparing sausages, franks and other encased and linked meat products, the operation typically includes subjecting the meat emulsion to treatment in a product encasing machine wherein a meat emulsion is stuffed into either a natural casing such as an animal intestine or an artificial material of a delicate nature designed to accomplish the same purpose. After the encasing material is stuffed with meat emulsion the encased meat emulsion is subjected to a linking apparatus which is designed to impart the traditional links to the weiners, sausages or the like. Subsequently, the linked franks are looped to provide for easy movement and shipping. This invention relates to an improvement for the meat encasing machine.

Presently known product-encasing devices typically include a stuffing tube, a pump for pumping the meat emulsion through the stuffing tube, a rotary chuck in front of the stuffing tube to impart rotary motion to the casing, a linking apparatus for linking the filled casing and a looping apparatus for arranging the links in loops. The meat encasing machine operates in the following manner. The folded casing is mounted over the stuffing tube. The folded casing is compressed in accordian-like fashion and includes one unfolded end protruding beyond the discharge end of the stuffing tube. As the product issues from the discharge end of the stuffing tube it fills the portion of the casing protruding there beyond, thereby filling the casing and propelling it away from the discharge end so that additional portions of the casing will be unfolded and moved emulsion through the stuffing tubs, front of the end of the stuffing tube. Presently known devices utilize, typically, a nonrotatable stuffing tube and include a chuck surrounding the filled casings and rotating so as to impart a rotary motion to the casing. Thereafter the linking device which is positioned in front of the discharge end of the stuffing tube pinches the rotating casing at various points along its length to create a plurality of links.

Co-pending application of Townsend et al entitled APPARATUS FOR ENCASING A PRODUCT, filed Dec. 14, 1972, Ser. No. 315,100, relates broadly to an improvement in the above described product encasing machine. The disclosure of that application is hereby incorporated by reference. Generally, the product encasing machine of that invention employs a rotatable stuffing tube having a fin head mounted on its forward end. Thus, the stuffing tube and the meat emulsion therein are subjected to rotary motion. Thus the invention of that application differs from typical prior art meat encasing methods, in at least one manner, by utilizing a rotating stuffing tube and rotating meat emulsion as opposed to a stationary stuffing tube. The stuffing tube has a fin head mounted on its forward end. The fin head imparts rotational drive and longitudinal drag to the casing as the casing passes thereover during the filling of the casing. As heretofore stated this invention relates to an improvement in the fin head or stuffing horn. The fin head, which is removably attached to the discharge end of the stuffing tube, imparts rotational drive and longitudinal drag to the casing in order to give the casing an opportunity to completely fill. Thus, the fin head is an important part of the encasing machine.

The fin head must be adapted to provide secure fastening between the discharge end of the stuffing tube and the rearward end of the fin head itself. However, in addition to providing a secure means of fastening between the discharge end of the stuffing tube and the rearward end of the stuffing horn or fin head, the two terms being utilized interchangeably herein, the fin head must be easily removable from the discharge end of the stuffing tube in order to provide easy access for cleaning, changing fin heads and the like.

In addition, it would be desirable to provide a fin head for mounting on the discharge end of a stuffing tube which would provide a smooth bore extending from the discharge end of the stuffing tube through the fin head. A smooth bore is desirable because, in the absence of a smooth bore extending therethrough, the meat emulsion passing through the stuffing tube will be forced against any irregularities therein with the result being that product flow will be impeded and a general state of turbulence and drag will occur. As a result the stuffing tube will not operate as efficiently.

Accordingly, it is an object of this invention to provide a new and improved fin head for mounting on the discharge end of a stuffing tube of a meat product encasing apparatus.

Another object of this invention is to provide a fin head which can be securely, but detachably mounted to the discharge end of a stuffing tube.

Yet another object of this invention is to provide a fin head which, when attached to the discharge end of a stuffing tube, provides a smooth bore relationship with respect to the bore of the stuffing tube.

Yet another object of this invention is to provide a fin head which can be quickly, with a minimum of difficulty, detachably and securely fastened to the discharge end of a stuffing tube.

The manner of accomplishing these and other objects of the invention will be apparent from the following detailed description of the invention.

DETAILED DESCRIPTION OF THE INVENTION.

Figure 1:
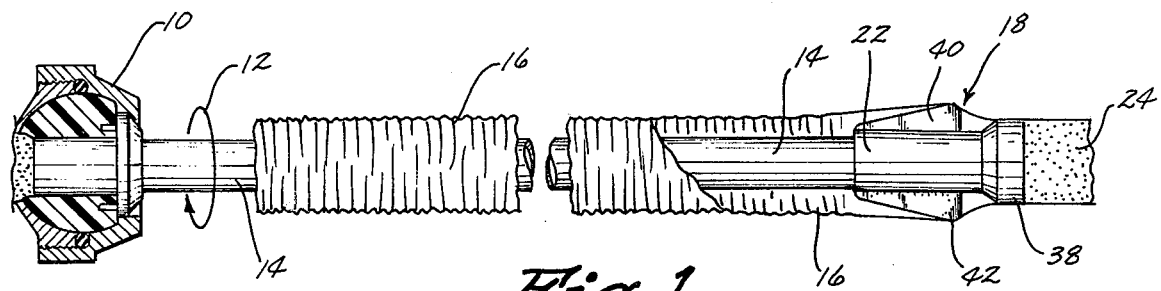
FIG. 1 is an in-use perspective view of the stuffing tube of a meat encasing machine, said stuffing tube having a meat casing positioned thereon.

Since a detailed description of the product encasing machine, employing a rotary stuffing tube, has been presented in the Townsend et al application, previously incorporated herein by reference, it will not be repeated in detail. However, FIG. 1 is provided to show a general understanding of the working of such a machine in order to more properly set the background for a description of the fin head of this invention. As previously indicated the product encasing machine, generally designated as 10, provides rotary motion in the direction indicated by arrow 12 to stuffing tube 14. Of course, before the system is placed into operation the accordion-folded casing 16 is placed over the stuffing tube 14. In order to easily allow for casing 16 is placed over the stuffing tube 14. In order to easily allow for casing 16 to be placed on stuffing tube 14, the fin head, generally designated as 18, is removed and the casing 16 is then slidably extended over stuffing tube 14 and the fin head 18 replaced thereon. Actuation of the power source of encasing machine 10, and a pump not depicted in the drawings, pumps the meat emulsion from the machine end of stuffing tube 14 forwardly to the discharge end 20 of the stuffing tube 14 and therefrom into the rearward portion 22 of fin head 18. The fin head 18 is rotating along with stuffing tube 14 and the fin head imparts rotational drive and longitudinal drag to the casing 16 as the casing passes thereover while the casing is being filled. The filled casing, depicted as 24, continues to move forwardly and is ready for the linking and looping operations previously mentioned.

Figure 2:
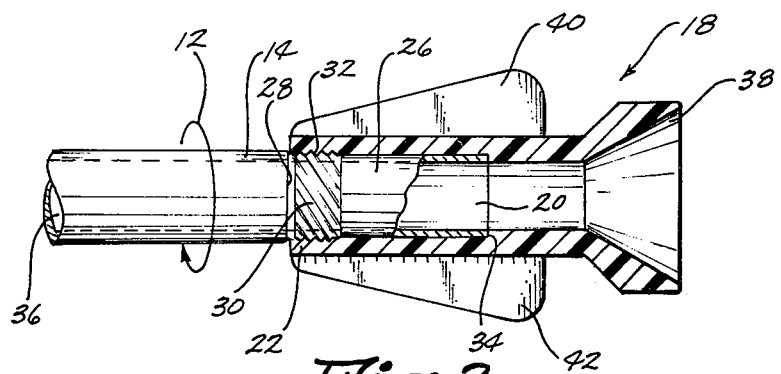
FIG. 2 is a side elevation view, with parts broken away, of the fin head of this invention mounted on the discharge end of a stuffing tube.
Figure 3:
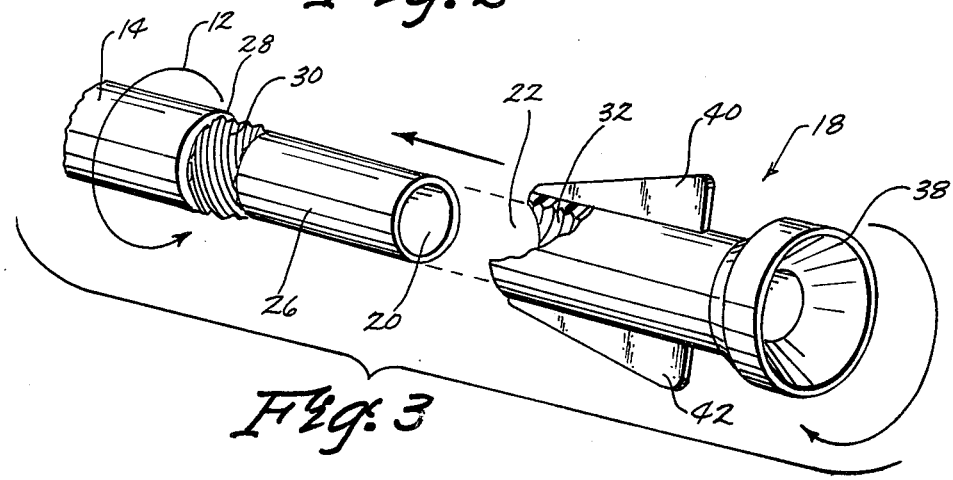
FIG. 3 is a perspective view of the discharge end of a stuffing tube and of a fin head showing the fin head prior to detachable securement to the discharge end of the stuffing tube.

FIGS. 2 and 3 show in detail the relationship of the discharge end 20 with the stuffing tube 14 and the rearward portion 22 of fin head 18. As seen in FIGS. 2 and 3, the discharge end 20 of stuffing tube 14 is provided with a reduced outside diameter portion 26 with the result being a shoulder 28 provided at the point that reduced diameter portion 26 begins. Forwardly of shoulder 28 is threaded portion 30 as will be explained in more detail hereinafter. It is preferred that threaded portion 30 be multiplicity threaded and most preferably is quadruple threaded.

Fin head 18 has threaded portion 32 positioned just forwardly of its rearward opening 22. Threaded portion 32 is designed to threadably receive threaded portion 30. Thus, it is preferred that threaded portion 32 also be multiplicity threaded and preferably be quadruple threaded.

Multiple threading of threaded portions 30 and 32 in order to provide the detachable securement of fin 18 to stuffing tube 14 has been found to be advantageous in that fin head 18 can be quickly and securely detachably secured to stuffing tube 14. Fin head 18 is simply slipped on the discharge end 20 of stuffing tube 14 and moved rearwardly until the threads 30 and 32 are in contact. Thereafter, fin head 18 is rotated slightly until threads 30 and 32 are entirely threadably engaged. Utilization of multiple threading, of course, means that fin head 18 need only be rotated a minimum amount in order to threadably secure it to stuffing tube 14. Moreover, multiple threading has the advantage of providing more secure attachment since there are more threads to provide the engaging relationship between stuffing tube 14 and fin head 18.

Fin head 18 is provided with shoulder 34 by slightly reducing its bore diameter. Shoulder 34 is of the correct dimensions to matingly receive the discharge end 20 of stuffing tube 14 such that a smooth continuous bore extends through stuffing tube 14 and fin head 18. It is preferred to have a smooth continuous bore from stuffing tube 14 into fin head 18 (this bore is depicted as 36) for several reasons. In the absence of a smooth bore, meat emulsion 24 which is moving forwardly in bore 36 of stuffing tube 14 towards the discharge end 20 thereof, will be disrupted by any irregularities in the surface of bore 36. This disruption will induce turbulence and drag and impede the desired smooth streamline continuous flow of meat emulsion.

Fin head 18 is provided with a funnel-like opening 38 at its forward end which communicates with bore 36. A pair of fins 40 and 42 extend outwardly from fin head 18 as illustrated in FIGS. 2 and 3. Fin heads 40 and 42 are identical and preferably oppositely disposed with respect to the fin head 18. Of course, if desired, more or less fins can be provided. However, it has been found that the most satisfactory results are obtained if fin head 18 has two fins thereon. The diameter of the fin head is a matter of choice but it should be as large as possible but small enough so that the casing can be slipped easily thereover. With further regard to the fin head, it has been found the most satisfactory if the fins 40 and 42 thereon are positioned as far forward on the fin head 18 as possible. It has also been found preferable if the fin head is made of a nonmetallic flexible material.

What is claimed is:

1. In combination with a meat encasing apparatus including a rotatable stuffing tube having a discharge end comprising, a fin head threadably mounted on the discharge end of said stuffing tube, said fin head having rearward and discharge ends, said fin head having an interior bore extending therethrough between its discharge end and its rearward end, said interior bore being defined by rearward and discharge bore portions, said rearward bore portion having a greater diameter than said discharge bore portion thereby creating a shoulder therebetween, said stuffing tube having an exterior threaded portion positioned rearwardly of its discharge end and spaced therefrom, said fin head having an interior threaded portion at its rearward end for engagement with said exterior threaded portion of said stuffing tube, said shoulder receiving the forward discharge end of said stuffing tube whereby a smooth continuous bore extends from said stuffing tube into said fin head to allow product flow without impeding turbulence and drag.

2. The combination of claim 1 wherein said threaded portions are mulitple type threads.

* * * * *